(12) United States Patent
Nakayama et al.

(10) Patent No.: US 6,628,900 B2
(45) Date of Patent: Sep. 30, 2003

(54) LIGHT EMISSION DEVICE AND CAMERA EQUIPPED THEREWITH

(75) Inventors: Haruki Nakayama, Hachioji (JP); Kosei Miyauchi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/846,288

(22) Filed: May 2, 2001

(65) Prior Publication Data

US 2001/0038752 A1 Nov. 8, 2001

(30) Foreign Application Priority Data

May 8, 2000 (JP) ........................................ 2000-134413

(51) Int. Cl.[7] ........................... G03B 15/06; G03B 15/02
(52) U.S. Cl. .......................................... 396/200; 362/16
(58) Field of Search ................................. 396/177, 178, 396/200; 362/3, 216, 16

(56) References Cited

U.S. PATENT DOCUMENTS

| 4,947,305 A | * | 8/1990 | Gunter, Jr. ................... 362/216 |
| 4,990,788 A | * | 2/1991 | Rabl et al. ................ 250/494.1 |
| 5,772,302 A | * | 6/1998 | Ishikawa et al. ............... 362/18 |
| 5,987,264 A | * | 11/1999 | Muramatsu et al. ........ 396/200 |

* cited by examiner

Primary Examiner—Russell Adams
Assistant Examiner—Arthur A Smith
(74) Attorney, Agent, or Firm—Finnegan, Henderson, Farabow, Garrett & Dunner, L.L.P.

(57) ABSTRACT

A light emission device having therein a light emission tube which is almost straight in shape and emits light in a radial manner and a reflection shade that reflects light emitted from the light emission tube toward an object, wherein the reflection shade has a reflection surface in which light emitted from the light emission tube in the direction opposite to the direction from the center of the light emission tube to an object and reflected on the reflection shade does not interfere with the light emission tube.

5 Claims, 7 Drawing Sheets

LIGHT EMISSION DEVICE AND CAMERA EQUIPPED THEREWITH

BACKGROUND OF THE INVENTION

The present invention relates to a light emission device, and in particular, to a light emission device that is efficient and is used for a camera and a camera equipped with the light emission device.

In the case where luminance of an object is low when the object is photographed by a camera, it is conducted that a light emission device is interlocked with shutter releasing to emit light and an appropriate exposure is obtained by reflected light from the object. The light emission device of this type can emit flash light when high voltage is impressed on a light emission tube such as a xenon tube. To utilize effectively light emitted from the light emission tube, there is provided, around the light emission tube, a reflection shade that is left open in one direction.

Incidentally, light emitted from the light emission device is attenuated in accordance with its distance, and it is necessary to emit light of higher intensity in terms of quantity of light for an object located at a greater distance. However, when a light emission device is equipped on a camera, its size and cost are restricted, and it is not always possible to prepare a highly efficient light emission device. Though high voltage is needed for making a xenon tube to emit light, even when a light emission tube is changed to one having a large capacity, there is feared a problem that charging takes a long time, because a capacity of a battery is restricted.

Though a light emission tube is usually arranged in the vicinity of a reflection shade, how to support the light emission tube stably without sacrificing easy assembling while keeping low cost is a problem.

SUMMARY OF HE INVENTION

The invention has been achieved in view of the problems stated above, and its object is to provide a light emission device wherein an amount of light emission can be increased only by changing a shape of a reflection shade in a conventional light emission device and a light emission tube can be supported firmly and to provide a camera equipped with the light emission device.

The objects mentioned above are attained by any one of the following structures of light emission devices.

Structure 1: A light emission device having therein a light emission tube which is almost straight in shape and emits light in a radial manner and a reflection shade that reflects light emitted from the light emission tube toward an object, wherein the reflection shade has a reflection surface wherein light emitted from the light emission tube in the direction opposite to the direction from the center of the light emission tube to an object and is reflected on the reflection shade does not interfere with the light emission tube.

Structure 2: A light emission device having therein a light emission tube which is almost straight in shape and emits light in a radial manner and a reflection shade that reflects light emitted from the light emission tube toward an object, wherein the reflection shade has a reflection surface by which a part of reflected light which is to interfere with the light emission tube when the reflected light is reflected on a flat reflection plate that is in contact with the light emission tube is reflected toward the object without interfering with the light emission tube.

Structure 3: A light emission device having therein a light emission tube which is almost straight in shape and emits light in a radial manner and a reflection shade that reflects light emitted from the light emission tube toward an object, wherein the reflection shade has a reflection surface which is behind the position of the reflection shade corresponding to at least the rearmost portion of the light emission tube.

Structure 4: A light emission device having therein a light emission tube which is almost straight in shape and emits light in a radial manner and a reflection shade that reflects light emitted from the light emission tube toward an object, wherein the reflection shade has thereon a ridge which is protruded toward the light emission tube and is extended to be in parallel with the longitudinal direction of the light emission tube.

Structure 5: A light emission device having therein a light emission tube which is almost straight in shape and emits light in a radial manner and a reflection shade that reflects light emitted from the light emission tube toward an object, wherein the reflection shade has thereon a surface that is circumscribed with the rearmost portion of the light emission tube on the inner surface of the reflection shade.

Structure 6: A light emission device having therein a light emission tube which is almost straight in shape and emits light in a radial manner and a reflection shade that reflects light emitted from the light emission tube toward an object, wherein the reflection shade has thereon a groove that is extended to be in parallel with the longitudinal direction of the light emission tube on the side opposite to an object.

Structure 7: A light emission device having therein a light emission tube which is almost straight in shape and emits light in a radial manner and a reflection shade that reflects light emitted from the light emission tube toward an object, wherein the reflection shade has thereon at least two surfaces extended in the direction toward an object and at least two surfaces extended in the direction different from that toward an object, both facing each other with the light emission tube between them.

Structure 8: A light emission device having therein a reflection shade that supports at least a part of a light emission tube which is almost straight in shape and emits light in a radial manner, wherein the reflection shade is equipped with a reflection portion arranged on the circumference of the light emission tube, a flank portion provided on a side edge on at least one side of the reflection portion, and with paired arm portions formed on the flank portion, and the light emission tube is supported between the paired arms, while, the paired arms are formed to keep the form even when the reflection portion is changed in terms of shape in the direction to be opened in the flank portion.

Incidentally, in each Structure, light is made to advance toward an object without advancing toward the light emission tube, which implicates that light subjected to secondary reflection on the reflection surface advances toward an object as a result.

DETAILED DESCRIPTION OF THE INVENTION

Since a light emission device of Structure 1 is represented by one having therein a light emission tube which is almost straight in shape and emits light in a radial manner and a reflection shade that reflects light emitted from the light emission tube toward an object, wherein the reflection shade has a reflection surface wherein light emitted from the light emission tube in the direction opposite to the direction from the center of the light emission tube to an object and is reflected on the reflection shade does not interfere with the light emission tube, it is possible to reflect light that interferes with the light emission tube and was not utilized effectively in a light emission device in conventional technology, for example, and thereby to increase an amount of emitted light in the light emission device without increasing energy to be inputted in the light emission tube.

Since a light emission device of Structure 2 is represented by one having therein a light emission tube which is almost straight in shape and emits light in a radial manner and a reflection shade that reflects light emitted from the light emission tube toward an object, wherein the reflection shade has a reflection surface by which a part of reflected light which is to interfere with the light emission tube when the reflected light is reflected on a flat reflection plate that is in contact with the light emission tube is reflected toward the object without interfering with the light emission tube, it is possible to reflect light that interferes with the light emission tube and was not utilized effectively in a light emission device in conventional technology, for example, and thereby to increase an amount of emitted light in the light emission device without increasing energy to be inputted in the light emission tube.

Under the conditions that a reflection mirror is in contact with a light emission tube and light is emitted in one direction, when the reflection mirror is a flat reflection mirror, it has been confirmed that light emitted from the light emission tube and reflected on the reflection mirror interferes least with the light emission tube. In other words, in the case of a conventional concave mirror that surrounds a light emission tube, an amount of light interfering with the light emission tube is more than that in the case where a flat reflection mirror (plane mirror) is used.

Each of FIGS. 6–10 is a side view showing positional relationship between light emission tube 21 and plane mirror 22'. As is apparent geometrically from FIGS. 6–8, when the light emission tube 21 is divided roughly by plane P passing the center of the light emission tube 21 and a point where the light emission tube 21 is in contact with plane mirror 22', light emitted from the range of an angle 0°–20° formed by plane P on the side of plane mirror 22' on the roughly halved light emission tube 21 interferes with the light emission tube 21 to be unable to advance toward an object.

However, if the plane mirror 22' is inclined to face upward as shown in FIG. 9, light emitted from light emission tube 21 at the position of angle 20° formed with plane P is reflected by plane mirror 22' and can advance to an object at an emission angle 56°, for example, without interfering with light emission tube 21. On the other hand, if the plane mirror 22' is inclined to face downward as shown in FIG. 10, light emitted from light emission tube 21 at the position of angle 20° in the same way is reflected by plane mirror 22' and can advance to an object at an emission angle 42°, for example, without interfering with light emission tube 21. The invention is one employing this principle. By changing an inclination of plane mirror 22' in accordance with an angle formed with plane P ideally, it is possible to obtain a continued curved surface which can avoid most the interference of light of a reflection tube.

From the foregoing, it can be said that it is possible to make light to advance toward an object more conspicuously, compared with conventional technologies, if a part of reflected light to interfere with the light emission tube when reflected on the plane reflection plate is represented by reflection light to be reflected within a range of at least 20° or more from the point where the light emission tube is in contact with the reflection plate with the light emission tube with the center of the light emission tube serving as an axis, on at least one side of the roughly halved light emission tube when the light emission tube is divided roughly by a plane passing the center of the light emission tube and a point where the light emission tube is in contact with reflection plate.

Incidentally, it is preferable that the reflection shade has thereon a reflection surface on which light emitted from the center of the light emission tube within a range of 100° or more in the direction opposite to the direction toward object is reflected without interfering the light emission tube.

Further, it is preferable if light interfering with the light emission tube among light emitted from the light emission tube and reflected on the reflection shade is represented by light emitted from the light emission tube within a range of 40° or less.

Since a light emission device of Structure 3 is represented by one having therein a light emission tube which is almost straight in shape and emits light in a radial manner and a reflection shade that reflects light emitted from the light emission tube toward an object, wherein the reflection shade has a reflection surface which is behind the position of the reflection shade corresponding to at least the rearmost portion of the light emission tube, it is possible to reflect light that interferes with the light emission tube and was not utilized effectively in a light emission device in conventional technology, for example, and thereby to increase an amount of emitted light in the light emission device without increasing energy to be inputted in the light emission tube.

Incidentally, it is preferable that the rearmost portion of the light emission tube is its end portion located to be opposite to an object, to which, however, the invention is not limited.

Further, it is preferable that a reflection surface behind the position of the reflection shade corresponding to at least the rearmost portion of the light emission tube has a shape to be isolated from the rearmost portion of the light emission tube, to which, however, the invention is not limited. FIG. 11 is a diagram showing an example of a light emission device having therein light emission tube 21 having rearmost portion 21c and reflection shade 22, satisfying the requirements of the invention, in which, however, the invention is not limited to the structure illustrated in the diagram.

In an example in FIG. 11, reflection shade 22 narrows gradually as its position goes backward beyond light emission tube 21, and it has at least two grooves 22m and 22n extended in the longitudinal direction of the light emission tube 21.

Since a light emission device of Structure 4 is represented by one having therein a light emission tube which is almost straight in shape and emits light in a radial manner and a reflection shade that reflects light emitted from the light emission tube toward an object, wherein the reflection shade has thereon a ridge which is protruded toward the light emission tube and is extended to be in parallel with the longitudinal direction of the light emission tube, it is possible to reflect, by means of the surface of the ridge, light that interferes with the light emission tube and was not utilized effectively in a light emission device in conventional technology, for example, and thereby to increase an amount of emitted light in the light emission device without increasing energy to be inputted in the light emission tube. Incidentally, in the example shown in FIG. 11, the ridge is represented by a portion shown with symbol 22k, to which, however, the invention is not limited.

Further, it is preferable that the light emission tube is in contact with the ridge of the reflection shade.

Since a light emission device of Structure 5 is represented by one having therein a light emission tube which is almost straight in shape and emits light in a radial manner and a reflection shade that reflects light emitted from the light emission tube toward an object, wherein the reflection shade has thereon a surface that is circumscribed with the rearmost portion of the light emission tube on the inner surface of the reflection shade, it is possible to reflect light that interferes with the light emission tube and was not utilized effectively in a light emission device in conventional technology, for example, and thereby to increase an amount of emitted light in the light emission device without increasing energy to be inputted in the light emission tube.

Since a light emission device of Structure 6 is represented by one having therein a light emission tube which is almost straight in shape and emits light in a radial manner and a reflection shade that reflects light emitted from the light emission tube toward an object, wherein the reflection shade has thereon a groove that is extended to be in parallel with the longitudinal direction of the light emission tube on the side opposite to an object, it is possible to reflect, by means of the surface of the groove, light that interferes with the light emission tube and was not utilized effectively in a light emission device in conventional technology, for example, and thereby to increase an amount of emitted light in the light emission device without increasing energy to be inputted in the light emission tube. FIG. 12 is a diagram showing an example of a light emission device having therein light emission tube 21 and reflection shade 22 having groove 22r both satisfying requirements of the invention, in which, however, the invention is not limited to the illustrated structure.

In the light emission device that is symmetrical about plane P passing through the center of light emission tube 21 and extending in the direction to halve roughly an opening angle of reflection shade 22 as shown in FIG. 12, it is preferable that light emitted from light emission tube 21 and reflected on reflection surface 22p on the groove positioned on one side of the roughly halved reflection shade 22 is reflected on reflection surface 22q of the reflection shade positioned on the other side of the roughly halved reflection shade, to be radiated toward an object.

Since a light emission device of Structure 7 is represented by one having therein a light emission tube which is almost straight in shape and emits light in a radial manner and a reflection shade that reflects light emitted from the light emission tube toward an object, wherein the reflection shade has thereon at least two surfaces (surfaces 22s and 22t in the example in FIG. 12 to which the invention is not limited) which interpose the light emission tube and extend toward the object and at least two surfaces (surfaces 22p and 22q in the example in FIG. 12 to which the invention is not limited) extending in the direction different from the direction toward the object, it is possible to reflect light that interferes with the light emission tube and was not utilized effectively in a light emission device in conventional technology, for example, and thereby to increase an amount of emitted light in the light emission device without increasing energy to be inputted in the light emission tube.

Since a light emission device of Structure 8 is represented by one having therein a reflection shade that supports at least a part of a light emission tube which is almost straight in shape and emits light in a radial manner, wherein the reflection shade is equipped with a reflection portion arranged on the circumference of the light emission tube, a side portion provided on the side edge on at least one side of the reflection portion and paired arm portions formed on the side portion, and the light emission tube is supported between the paired arm portions, while, the paired arm portions are formed to maintain their shapes even when the reflection portion is deformed in the direction to open in the side portion, it is possible to maintain a relative distance of the arm portions and thereby to support the light emission tube firmly, even when the reflection portion is deformed in the course of incorporating or deformed by a vibration.

Further, it is preferable that the reflection portion is curved to be concaved, the side portion on at least one side is formed with two plate members extending in the direction to face each other from the side of the reflection portion, and the arm portion is formed on one of the two plate members.

Further, when the arm portion has a shape wherein a distance between the arms decreases as it approaches the inner part of the reflection portion, the light emission tube can stably be supported if the light emission tube is urged toward the inner part of the reflection portion by rubber or a spring.

It is preferable that the light emission device is provided in a camera which includes, in this case, a camera of a silver halide type, an electronic camera and a lens-fitted film unit.

Figure 5:
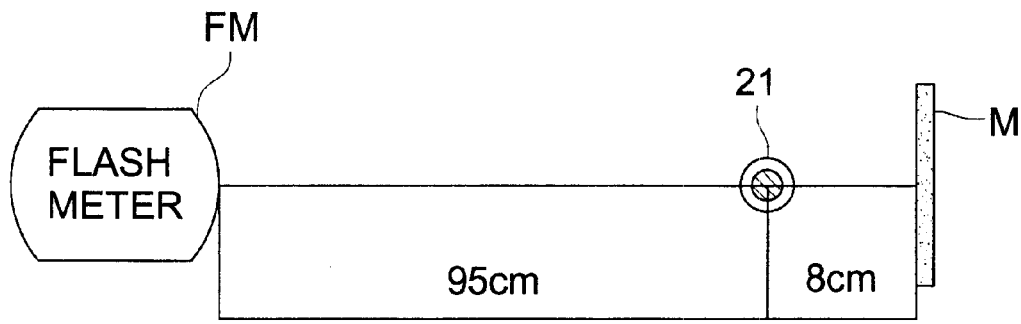
Figure 5:
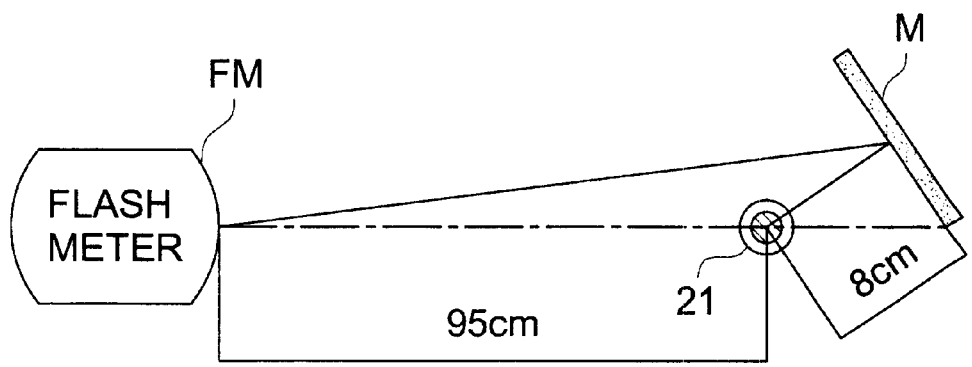
Figure 5:
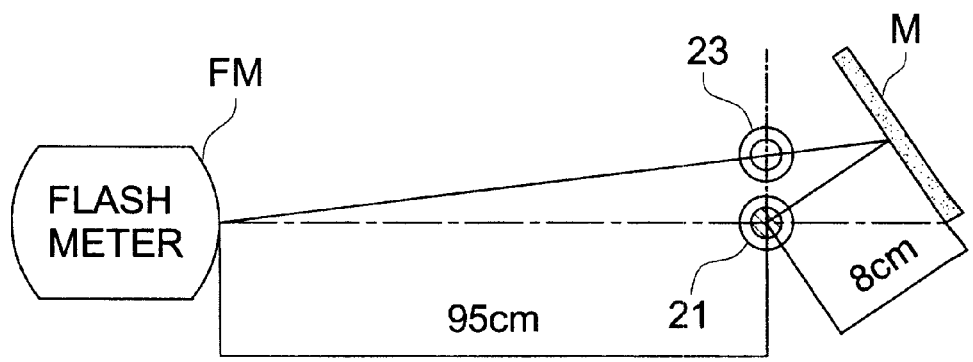

Each of FIGS. 5(a), 5(b) and 5(c) is a diagram showing a test equipment that measures an amount of light emitted from a xenon tube.

Figure 6:
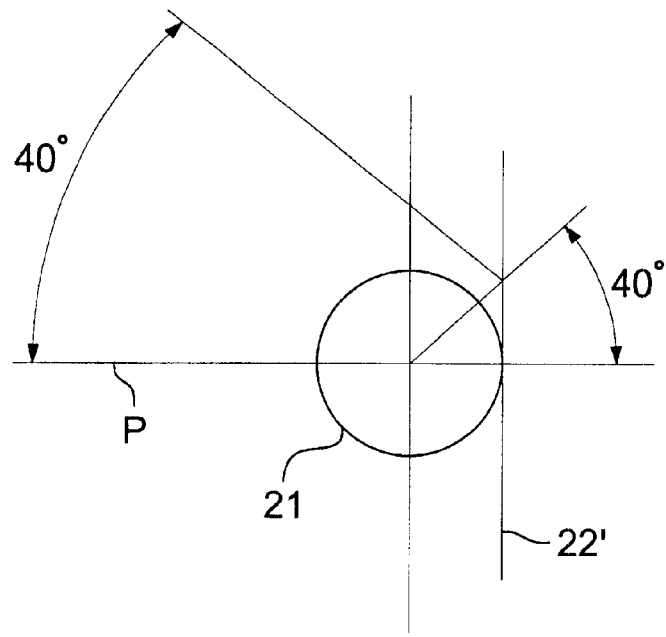

FIG. 6 is a diagram showing positional relationship between light emission tube 21 and plane mirror 22'.

Figure 7:
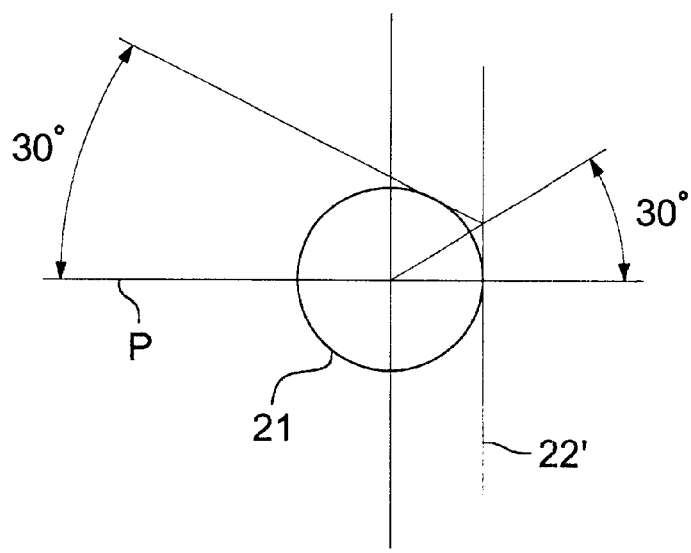

FIG. 7 is a diagram showing positional relationship between light emission tube 21 and plane mirror 22'.

Figure 8:
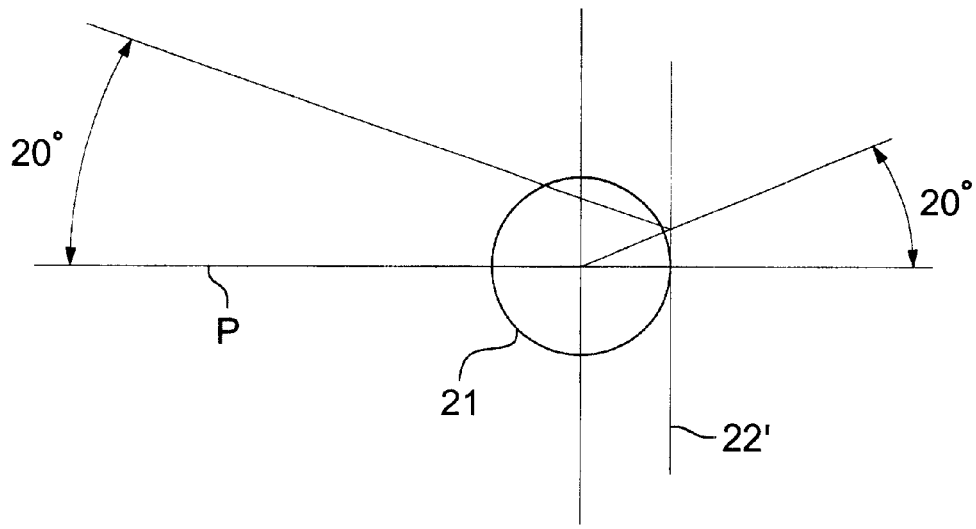

FIG. 8 is a diagram showing positional relationship between light emission tube 21 and plane mirror 22'.

Figure 9:
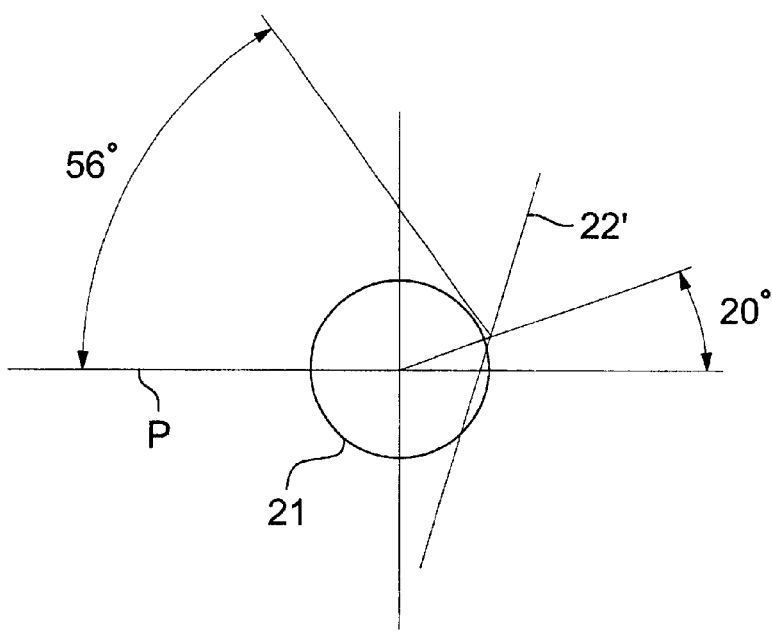

FIG. 9 is a diagram showing positional relationship between light emission tube 21 and plane mirror 22'.

Figure 10:
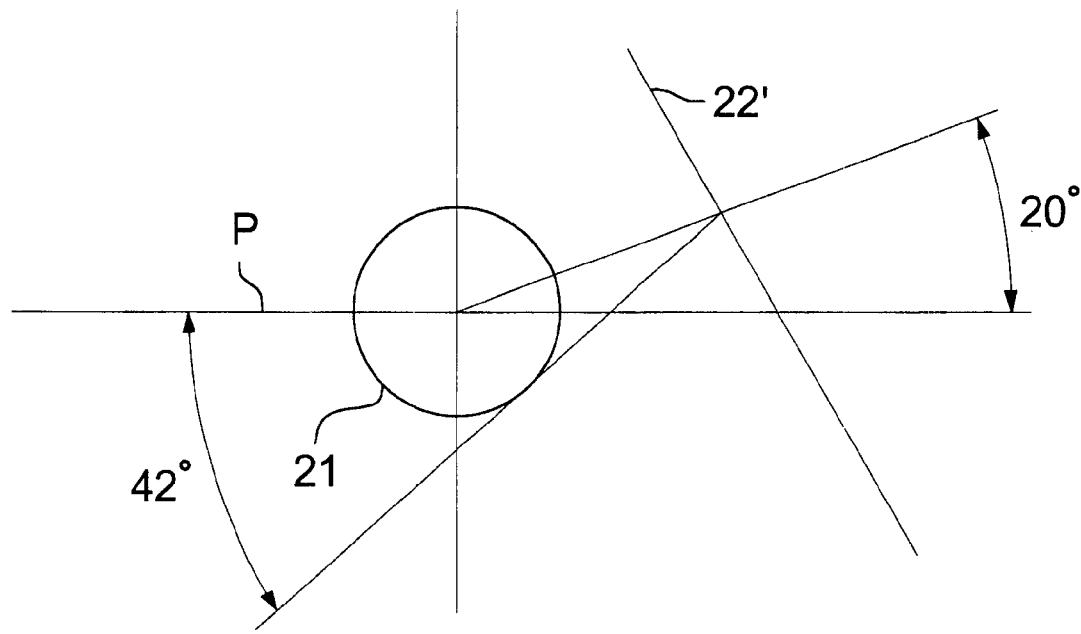

FIG. 10 is a diagram showing positional relationship between light emission tube 21 and plane mirror 22'.

Figure 11:
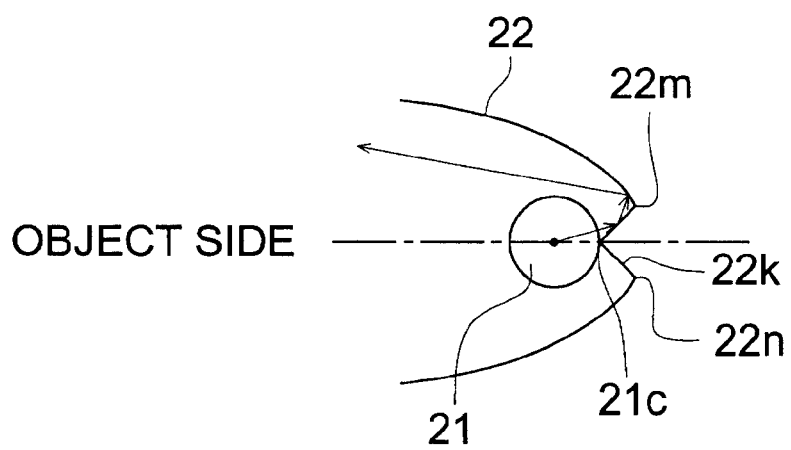

FIG. 11 is a diagram showing an example of a light emission device which satisfies requirements of the invention and has therein light emission tube 21 with its rearmost portion 21c and reflection shade 22.

Figure 12:
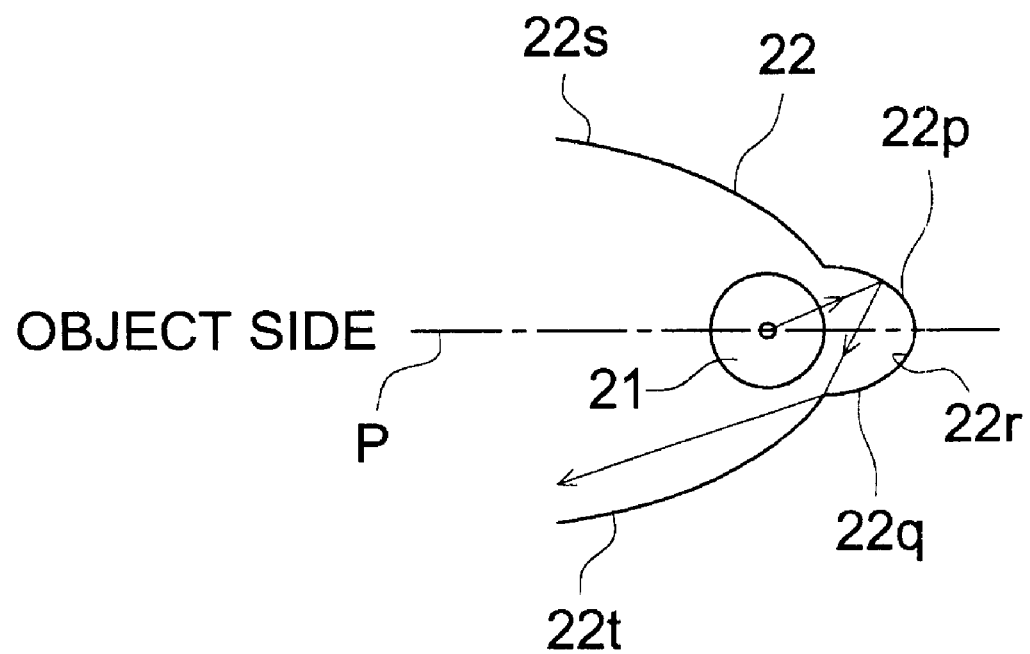

FIG. 12 is a diagram showing an example of a light emission device which satisfies requirements of the invention and has therein light emission tube 21 and reflection shade 22 having groove 22r.

DETAILED DESCRIPTION OF THE PREFERRED EMBODIMENT

Figure 1:
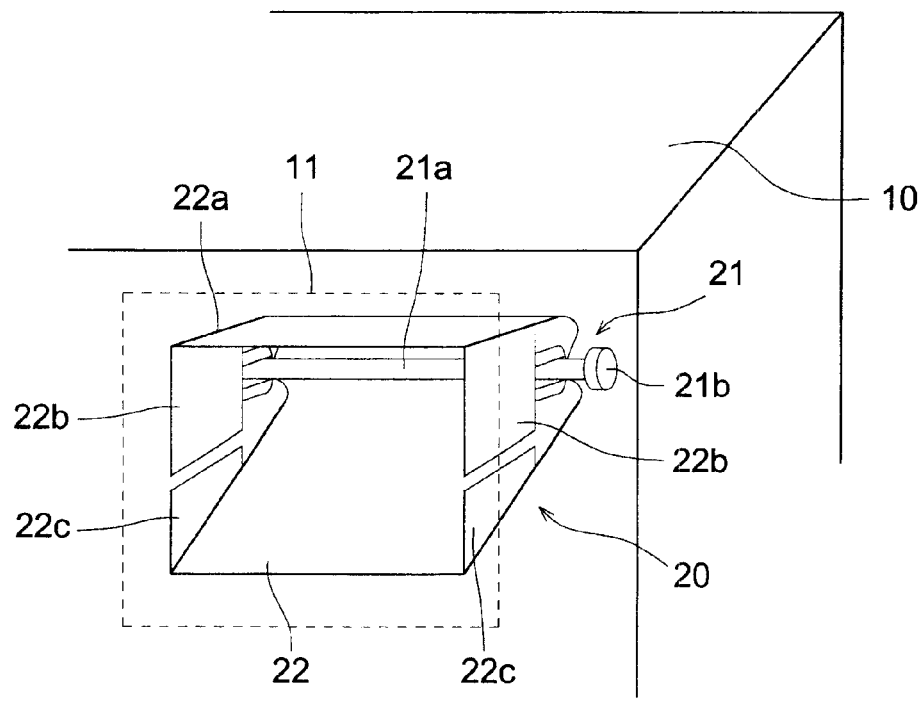
FIG. 1 is a perspective view showing how a light emission device in the present embodiment is equipped on a camera.

An embodiment of the invention will be explained as follows, referring to the drawings FIG. 1 is a perspective view showing how a light emission device in the present embodiment is equipped on a camera.

Figure 2:
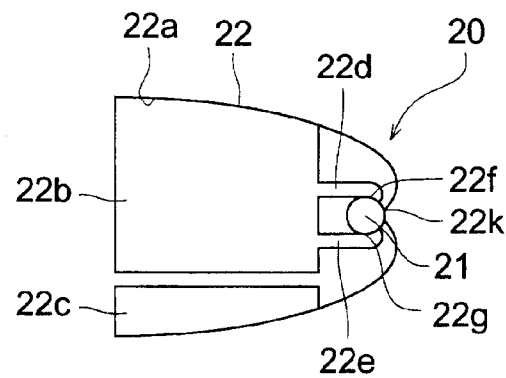
FIG. 2 is a lateral cross section of the light emission device in FIG. 1.

FIG. 2 is a lateral cross section of the light emission device in FIG. 1. In FIG. 1, light emission device 20 is arranged in light emission window 11 located at upper right of camera 10. The light emission device 20 is composed of xenon tube 21 representing a luminous tube which is almost straight in shape and emits light in a radial manner, reflection shade 22 and an unillustrated drive control section.

The reflection shade 22 is one that is formed by folding an aluminum plate, and it has reflection portion 22a that is formed with a curved surface that is bent to have the cross section which is mostly U-shaped, and side portions 22b and 22c extending respectively downward and upward from both side edges in the vicinity of both ends of the reflection portion 22a. Incidentally, as shown in FIG. 2, ridge portion 22k is formed in the inner part of the reflection shade 22.

Side portion 22b extending downward from the upper portion is greater in terms of area than side portion 22c extending upward from the lower portion, and is provided with paired arm portions 22d and 22e both extending toward the inner part of the reflection portion 22a. The paired arm portions 22d and 22e are extending to be almost in parallel each other, and their tips 22f and 22g are bent inside to be closer each other. Therefore, the relative distance between arm portion 22d and arm portion 22e is smaller as it approaches the tips 22f and 22g, namely, the inner part of the reflection portion 22a.

On xenon tube 21, there are formed light emission section 21a which is almost cylindrical in shape and knob-shaped portions 21b (only one is illustrated in FIG. 1) formed on both ends of light emission section 21a. An outside diameter of the knob-shaped portion is greater than a distance between arm portions 22d and 22e, and an outside diameter of the light emission section 21a is greater than a distance between the tips 22f and 22g. Incidentally, it is assumed that xenon tube 21 representing a light emission tube emits light linearly in a radial manner at its central axis.

When incorporating xenon tube 21 on reflection shade 22, the xenon tube 21 is made to pass through a clearance between arm portions 22d and 22e with knob-shaped portions 21b on one side being placed at a position other than the tips 22f and 22g, and then, is urged toward the inner part of reflection portion 22a by an unillustrated silicone rubber. This makes light emission section 21a of the xenon tube 21 to be interposed between the tips 22f and 22g to be supported stably, even when ridge portion 22k is formed in the inner part of the reflection portion 22a.

Figure 3:
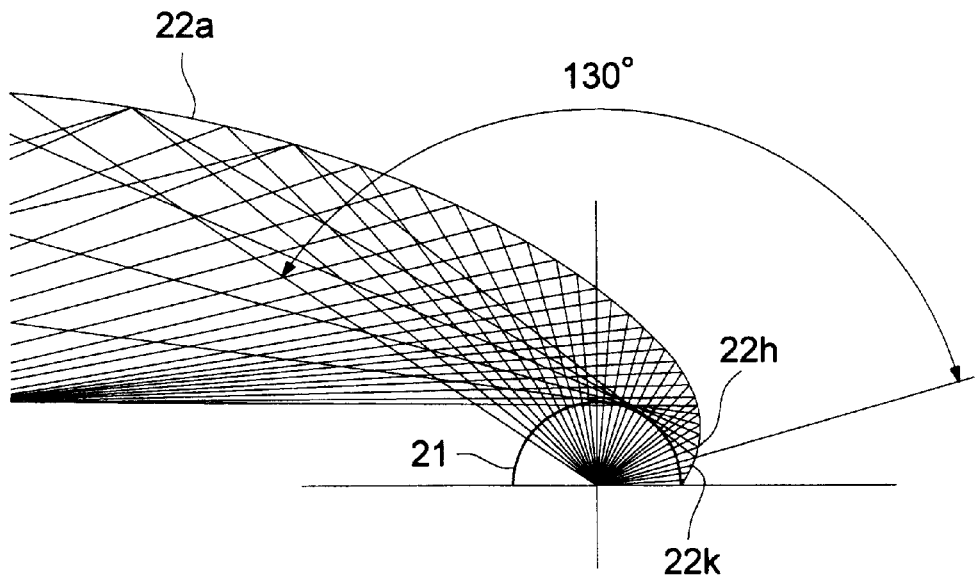
FIG. 3 is a diagram showing the state of reflection on a reflection shade (upper half) in a light emission device of the present embodiment.
Figure 4:
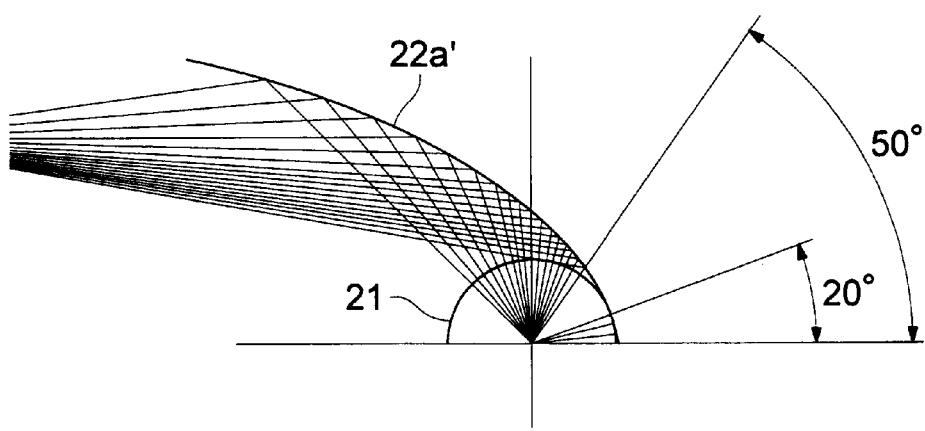
FIG. 4 is a diagram showing the state of reflection on a reflection shade (upper half) in a light emission device shown as a comparative example.

FIG. 3 is a diagram showing the state of reflection on a reflection shade (upper half) in a light emission device of the present embodiment, and FIG. 4 is a diagram showing the state of reflection on a reflection shade (upper half) in a light emission device shown as a comparative example.

With regard to a reflection shade of a general light emission device, since the inner part of reflection shade 22a' is a curved surface as shown in FIG. 4, it is possible to support a xenon tube stably only by urging it toward the inner part of reflection shade 22a' with a silicone rubber, even when the xenon tube is cylindrical. On the contrary, ridge portion 22k is formed on the inner and bottom portion of reflection portion 22a of the reflection shade 22 in the present embodiment. Therefore, for supporting xenon tube 21 stably, arm portions 22d and 22e are needed. Namely, from the viewpoint of supporting xenon tube 21, it is preferable that no ridge portion 22k exists originally.

However, it is possible to make light emitted from xenon tube 21 to advance outward more efficiently, by providing ridge portion 22k (precisely speaking, concaved curved surfaces 22h formed collaterally at the upper and lower portions when the ridge portion 22k is formed). The reason for that will be explained as follows, on a geometrical basis.

In a comparison between FIG. 3 and FIG. 4, in the case of a comparative example of the light emission device in FIG. 4, the surface of xenon tube 21 is in contact with reflection portion 22a' in a range of about ±20° from a horizontal plane on the rear side of the xenon tube 21, and light reflected from reflection portion 22a' within a range of about ±50° from a horizontal plane enters the xenon tube 21 again. On the other hand, in light emission device 20 in the present embodiment, light reflected from reflection portion 22a on the area outside a range of about ±20° from a horizontal plane on the rear side of the xenon tube 21 is totally made to advance outward as shown in FIG. 3.

An unknown point in this case is how an amount of light emission is affected by light entering xenon tube 21 which is partially transparent. The results of tests made by the inventors of the invention will be shown below.

Each of FIGS. 5(a)–5(c) is a diagram showing a test equipment for measuring an amount of light emission of a xenon tube. The xenon tube 21 used is the same in terms of specifications as that in light emission device 20 in the present embodiment. Flash meter FM for measuring an amount of light emission was arranged at a point of 95 cm in the forward direction from the xenon tube 21, and the xenon tube 21 was made to emit light while changing conditions, so that an amount of light emission was measured by the flash meter FM. Incidentally, electric power to be supplied to the xenon tube 21 for light emission was constant.

First, when a light-intercepting amount (guide number) under the condition of no mirror was checked, it was GNo 3.50, and when xenon tube 21 was made to emit light plural times under the condition that flash meter FM, xenon tube 21 and mirror M were arranged in a straight line in this order as shown in FIG. 5(a) and a distance between the xenon tube 21 and the mirror M was made to be 8 cm, an average light-intercepting amount was GNo 3.94. Namely, an increase of light-intercepting amount caused by providing mirror M was +0.34 EV. The reason why an increase of light-intercepting amount is less despite reflected light directed toward flash meter FM by mirror M provided is presumed to be the xenon tube 21 itself which interrupts an increase of light-intercepting amount of flash meter FM.

Therefore, the inventors of the invention arranged the mirror M at the position so that light reflected on the mirror M may arrive at flash meter FM without being interrupted by xenon tube 21, while the distance of 8 cm between the xenon tube 21 and the mirror M was maintained, as shown in FIG. 5(b), and they made the xenon tube 21 to emit light several times under the aforesaid condition. The average light-intercepting amount was GNo 4.68. Therefore, a light-intercepting amount increased by changing the position of mirror M was +0.74 EV.

For the further confirmation, the inventors of the invention arranged xenon tube 23 in the non-light-emission state between mirror M and flash meter FM, in addition to the state shown in FIG. 5(b) (FIG. 5(c)), and made xenon tube 21 to emit light plural times under the condition stated above. The average light-intercepting amount was GNo 4.14. Therefore, a light-intercepting amount decreased by arranging xenon tube 23 in the non-light-emission state between mirror M and flash meter FM was −0.54 EV.

The results of the tests stated above have clarified that when a xenon tube is present in a path for light, passage of the light is blocked to a certain extent independently of whether the xenon tube is in a light-emission state or in a non-light-emission state, and an amount of light emitted out of a light emission device is reduced by an amount equivalent to the blocked light. In other words, it is possible to reduce an amount of light absorbed in xenon tube 21 by selecting appropriately a shape of reflection portion 21a, and thereby to increase an amount of light emission of light emission device 20. For this object, a shape of reflection portion 22a is established as follows in the present embodiment.

Namely, in the light emission device 20 of the present embodiment, light radiated to the back side of xenon tube 21 which has not been utilized effectively in a light emission device in conventional technologies can be reflected effectively in the forward direction, and an amount of light emission can be increased accordingly, because of a shape of each of upper and lower halves of reflection portion 22a of reflection shade 22 on which light emitted within a range of ±50 (100° in total for upper and lower) or more for a vertical plane passing through the central axis of the xenon tube 21 is reflected, as shown in FIG. 3.

Further, if reflection portion 22a is made to be a shape on which light emitted within a range of ±130° (260° in total for upper and lower) or more in each of upper and lower halves of xenon tube 21 can be reflected, it is possible to increase further an amount of light emission.

When a shape of reflection portion 22a is selected so that a part of light emitted from xenon tube 21 may be reflected twice by reflection portion 22a of reflection shade 22, light radiated to the back side of xenon tube 21 which has not been utilized effectively in a light emission device in conventional technologies can be reflected effectively in the forward direction, and an amount of light emission can be increased accordingly.

Further, when a shape of reflection portion 22a is selected so that light returning to a xenon tube among those emitted from xenon tube 21 and reflected on reflection portion 22a of refection shade 22 may be light emitted within a range of ±20° (40° in total) or more for a horizontal plane passing through the central axis of the xenon tube 21, light which has not been utilized effectively in a light emission device in conventional technologies can be reduced, and an amount of light emission can be increased accordingly.

Further, in light emission device 20 in the present embodiment, reflection portion 22a of reflection shade 22 is in contact with the surface of xenon tube 21 on its rear side at the position where the reflection portion 22a crosses a plane (horizontal plane) that passes through the center of xenon tube 21 and extends in the direction that roughly halves an opening angle of the reflection portion 22a of the reflection shade 22, as shown in FIG. 3, and it forms curved surface 22h that is isolated from xenon tube 21 within ±20° from a horizontal plane. The curved surface 22h makes it possible for light radiated to the back side of xenon tube 21 which has not been utilized effectively in a light emission device in conventional technologies to be reflected effectively in the forward direction, and thereby, an amount of light emission can be increased accordingly.

Incidentally, by forming ridge portion 22k that is in contact with the surface of xenon tube 21 at the position where a horizontal plane passing through the center of xenon tube 21 crosses on reflection portion 22a in the rear side of the xenon tube 21, it is possible to form curved surfaces 22h on its upper and lower portions.

The invention has been explained above, referring to the embodiments to which, however, the invention is not limited, and modification and improvement thereof are naturally possible.

The invention makes it possible to provide a light emission device wherein an amount of light emission can be increased and a light emission tube can be supported firmly only by modification of a shape of a reflection shade for a conventional light emission device, and to provide a camera equipped with light emission device.

What is claimed is:

1. A light emission device comprising:
    a light emission tube having a substantially straight shape for radially emitting light;
    a reflector for reflecting the light emitted from the light emission tube and for supporting a part of the light emission tube, the reflector having a rear section; and
    paired arm portions formed on a side edge on at least one side of the reflector for supporting the light emission tube therebetween,
    wherein the paired arm portions have an opening through which the light emission tube is set, and the opening has a shape in which a distance between the paired arm portions decreases as the paired arm portions approach the rear section of the reflector.

2. The light emission device of claim 1, wherein the reflector is formed in a concave shape to cover the light emission tube, the reflector having a pair of upper surface portions and lower surface portions at each of two side edge portions of the reflector, and wherein the paired arm portions are formed on the upper surface portions and the lower surface portions.

3. The light emission device of claim 1, wherein the reflector comprises a protruded portion that protrudes toward the light emission tube, the protruded portion extending in a direction parallel to a longitudinal direction of the light emission tube.

4. The light emission device of claim 3, wherein a circumferential surface of the light emission tube contacts the protruded portion of the reflector.

5. The light emission device of claim 3, further comprising means for urging the light emission tube toward the protruded portion of the reflector so that the reflector is held securely by the paired arm portions when the light emission tube is set through the opening.

* * * * *